United States Patent [19]
Weyermanns et al.

[11] Patent Number: 5,911,741
[45] Date of Patent: Jun. 15, 1999

[54] PROCESS AND DEVICE TO PELLETIZE SUBSTANCES WHICH CAN BE DISPENSED IN THE FORM OF DROPS

[75] Inventors: Gunther Weyermanns, Duisburg; Stefan Zerwas, Moers, both of Germany

[73] Assignee: Buse Gase GmbH & Co., Germany

[21] Appl. No.: 08/489,815

[22] Filed: Jun. 13, 1995

[30] Foreign Application Priority Data

Jun. 16, 1994 [DE] Germany .............................. 44 20 936

[51] Int. Cl.⁶ .................................................. F25D 13/06
[52] U.S. Cl. ..................... 62/63; 62/78; 62/381
[58] Field of Search .................... 62/63, 78, 381

[56] References Cited

U.S. PATENT DOCUMENTS

| | | | |
|---|---|---|---|
| 3,425,237 | 2/1969 | McLeese | 62/63 |
| 4,704,873 | 11/1987 | Imaike et al. | 62/78 |
| 4,843,840 | 7/1989 | Gibson | 62/375 |
| 4,848,094 | 7/1989 | Davis et al. | 62/78 |
| 5,275,016 | 1/1994 | Chatterjee et al. | 62/78 |

FOREIGN PATENT DOCUMENTS

| | | |
|---|---|---|
| 3711169 | 11/1989 | Germany . |
| 2092880 | 4/1985 | United Kingdom . |

*Primary Examiner*—Ronald C. Capossela
*Attorney, Agent, or Firm*—Connolly & Hutz

[57] ABSTRACT

The invention relates to a process and an apparatus for pelleting materials capable of forming drops, in which the materials to be pelleted are added dropwise into a coolant liquid bath (5), preferably a liquified gas, hardened and are kept separate on a vibratory conveyor unit (7) with supply of vibratory energy and are completely frozen solid, exploiting the temperature of the cold gas.

10 Claims, 1 Drawing Sheet

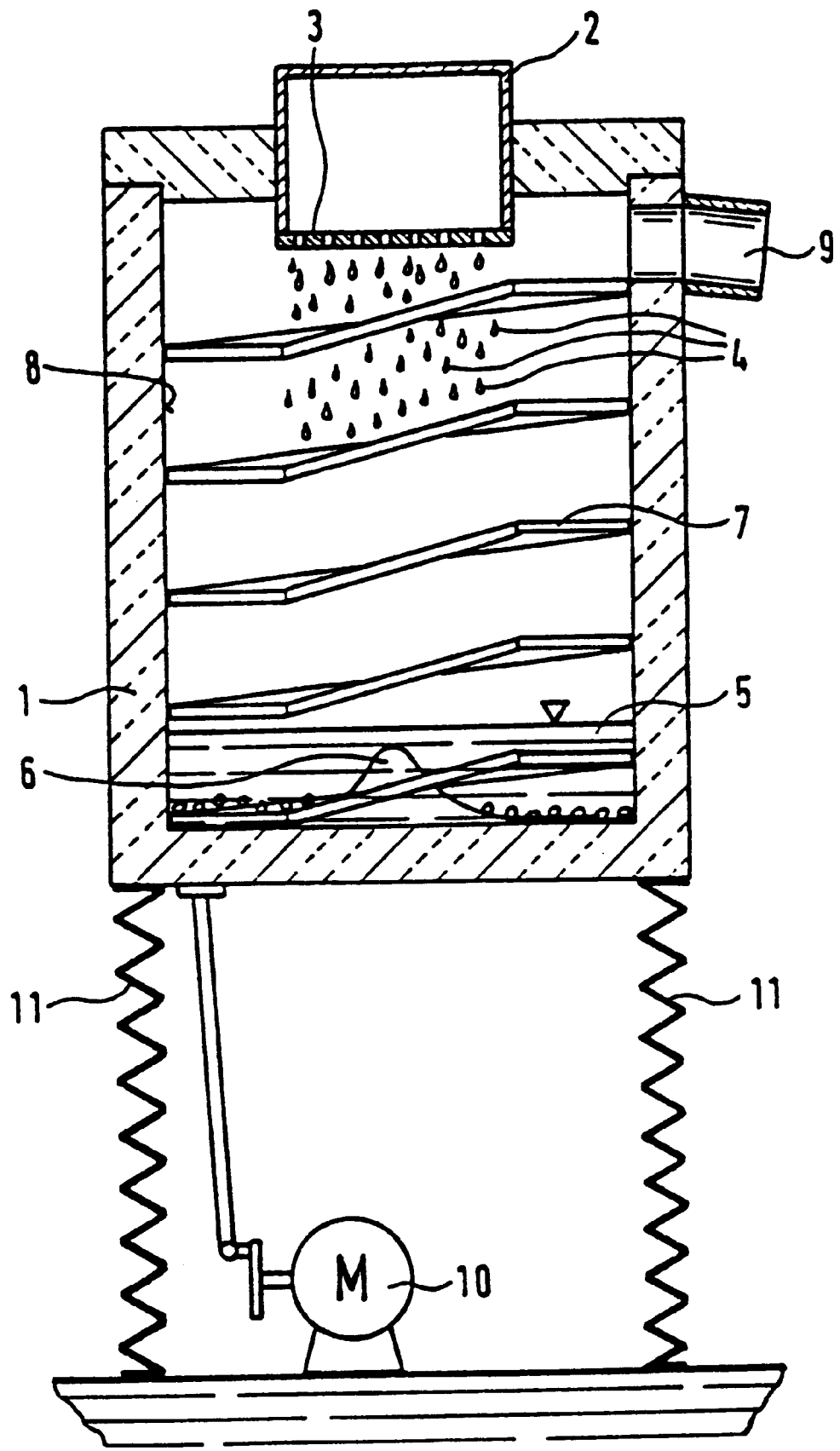

PROCESS AND DEVICE TO PELLETIZE SUBSTANCES WHICH CAN BE DISPENSED IN THE FORM OF DROPS

BACKGROUND OF THE INVENTION invention relates to a process and an apparatus for pelleting materials capable of forming drops.

Materials capable of forming drops are generally pelleted in such a manner that the materials to be pelleted are fed into a refrigerant bath which preferably comprises a liquefied gas such as liquid nitrogen.

An apparatus for pelleting viscose liquids is shown in DE 37 11 169 C2. In this apparatus a dropping apparatus is situated above a liquid nitrogen bath in which there is a transport belt, from which dropping apparatus uniform drops exit which sink in the liquid nitrogen bath and are transported out by the conveyor belt. The completely frozen pellets are then stored cold at a product-dependent temperature.

GB 2 092 880 B shows an apparatus in which the material to be pelleted is added dropwise to a bath of a coolant liquid, the liquid drops to be frozen being washed by a horizontal coolant stream onto a take-off apparatus before they lose their buoyancy. In a separation apparatus, the pellets are separated off and the refrigerant is recirculated to the refrigerant bath.

U.S. Pat. No. 4,843,840 shows an apparatus for a process in which the liquids to be frozen are precooled both by direct contact with the refrigerant in pipes and by indirect contact by return circuits of the used refrigerant by means of contact ducts running in parallel. After separating off the refrigerant, the particles thus precooled are completely frozen solid in the cold gas stream.

In the apparatus according to DE 37 11 169 C2, depending on the product to be processed, complex cleaning operations can be involved on the transport belt which itself is driven by a complex mechanism. The cold gas formed in the use of this apparatus is utilized only to a small extent in this process.

In the apparatus of GB 2 092 880, there is the disadvantage that amounts of refrigerant need to be transported over relatively long pathways, which leads to complex types of insulation and, if this measure is dispensed with, to high evaporation losses, in particular when liquid nitrogen is used as refrigerant. Refrigerant which has already evaporated is not utilized in this process either.

In the apparatus of U.S. Pat. No. 4,843,840, although the cold gas formed from the evaporation process in the precooling is utilized for complete freezing solid, the conveyer screw used for the secondary cooling, owing to the high number of precooled particles which are fed simultaneously from a plurality of cooling pipes running in parallel, is fed with such a large amount of particles that keeping the particles separate which is necessary for the production of high-rate pellet products is not achieved. In addition, a considerable expenditure in terms of machinery is connected with the said apparatus.

SUMMARY OF THE INVENTION

The object therefore underlying the invention is to create a process and an apparatus for pelleting substances capable of forming drops by means of a coolant liquid which enables a majority of the refrigeration capacity of the cold gas over the liquid phase to be utilized and the pellets to be kept separate in the cold gas phase.

By means of the invention it is now possible to produce in a simple and space-saving manner and inexpensively, owing to dispensing with complex individual parts, pellets from materials capable of forming drops in which in a particularly economical manner, the low-temperature gas phase of the refrigerant is utilized and the pellets can be kept separate.

THE DRAWING

The drawing depicts in diagrammatic form an apparatus for carrying out the process according to the invention.

DETAILED DESCRIPTION

Above an insulated vessel 1 is arranged and fixed, centered, a product feed apparatus 2 having a nozzle bottom 3, from which apparatus the material to be pelleted falls in the form of drops 4 into a coolant liquid bath 5 as far as the bottom 6 of the insulated vessel 1. Starting from the bottom 6 of the insulated vessel 1, a vibratory conveyor unit 7 is mounted concentrically and spirally on the inner wall 8 of the insulated vessel 1, which conveyor unit ends at the upper end of the insulated vessel 1 in a product outlet 9. The conical bottom 6 is situated at the lower turn of the spiral vibratory conveyor unit 7 so that the material to be pelleted is transported into the intake area of the conveyor unit. The insulated vessel 1 is connected to a vibrator motor 10 which enables the necessary vibration to be fed to the insulated vessel 1. The vibration is made possible by suspending the insulated vessel 1 on vibrating springs 11.

By means of the process according to the invention and the apparatus, a material capable of forming drops, such as for example a bacterial suspension, protein and vitamin solutions and innoculation sera can now be added dropwise into the insulated vessel. In the form preferably used, the product feed apparatus 2 is fixed to the insulated vessel 1 so that the vibration is also transmitted to the apparatus, by which means good drop detachment proceeds even in the case of materials which otherwise form drops with difficulty. The drops 4 fall, for example, into a liquid nitrogen bath 5, the level of which depends on the product properties, in particular the thermal conductivity. In this case hardening of the product surface takes place. After the frozen pellets have arrived at the bottom 6, they are brought by means of the vibration due to the vibrator motor 10 and the vibrating spring 11 to the vibratory conveyor unit 7 on which they are completely frozen solid under the influence of the refrigeration capacity of the cold gas formed by the evaporation and are kept separate by the vibration. As an alternative to a vibratory conveyor unit 7 which is fixed to the wall of the insulated vessel 1, a vibratory conveyor unit can also be mounted in such a way that it begins at the bottom 6 of the insulated vessel 1 and, without further contact with the insulated vessel 1, is independently excited by vibration, for example at the upper end. After leaving the product outlet 9, the finished pellets can be packaged deep-frozen.

Of course, the invention also enables the material to be pelleted to be already completely frozen solid in the liquid nitrogen bath.

What is claimed is:

1. A process for pelleting material capable of forming drops comprising feeding the material in the form of drops from at least one product feed apparatus into a refrigerant bath in an insulated vessel, freezing the drops solid as a result of the drops contacting the refrigerant to form the drops into pellets, and keeping the pellets separate by transporting the pellets under the action of vibration.

2. The process as claimed in claim 1 including hardening the drops in the refrigerant bath, and freezing the drops solid during the transporting step by means of a cold gas phase formed by evaporation of the refrigerant.

3. An apparatus for pelleting materials capable of forming drops comprising an insulated vessel having an upper end and a bottom, a coolant liquid bath in said vessel at said bottom of said vessel, at least one product feed apparatus mounted at said upper end of said vessel above said coolant liquid bath, said product feed apparatus including discharge structure for discharging pelleting material from said apparatus in the form of drops and directing the drops into said coolant liquid bath, a vibratory conveyor unit in said vessel for transporting frozen pellets formed by the drops contacting said coolant liquid bath, said vibratory conveyor unit having an intake area located in said coolant liquid bath in said bottom of said vessel, a product outlet in said vessel at said upper end, said vibratory conveyor unit extending to said product outlet for transporting the frozen pellets from said coolant liquid bath to said product outlet, and a vibrator motor operatively connected to said vibratory conveyor unit for vibrating said vibratory conveyor unit.

4. The apparatus as claimed in claim 3, wherein said product feed apparatus is arranged centrally over said insulated vessel, said vibratory conveyor unit is arranged concentrically in the form of a spiral, and said insulated vessel having an open cylindrical interior to form a falling path for the drops.

5. The apparatus as claimed in claim 4, wherein said product feed apparatus is fixed to said insulated vessel.

6. The apparatus as claimed in claim 3, wherein said product feed apparatus is fixed to said insulated vessel.

7. The apparatus as claimed in claim 3, wherein vessel has an interior wall, said vibratory conveyor unit being mounted to said interior wall, and said vibrator motor being operatively connected to said vessel to vibrate said vessel and thereby vibrate said vibratory conveyor unit.

8. The apparatus as claimed in claim 7, wherein product feed apparatus is fixed to sailed vessel for being vibrated by said vibrator motor.

9. The apparatus as claimed in claim 3, wherein said bottom of said vessel is conically shaped with its uppermost area above said intake area of said vibratory conveyor unit for directing frozen pellets to said intake area of said vibratory conveyor unit.

10. The apparatus as claimed in claim 3, wherein said vessel has an interior wall, said vibratory conveyor unit being with said vessel out of contact with said interior wall, and said vibrator motor being connected to said vibratory conveyor unit.

* * * * *